US010941698B2

(12) United States Patent
Quix et al.

(10) Patent No.: US 10,941,698 B2
(45) Date of Patent: Mar. 9, 2021

(54) METHODS AND SYSTEMS FOR A CONTROL VALVE OF A CIRCUIT

(71) Applicant: Ford Global Technologies, LLC, Dearborn, MI (US)

(72) Inventors: Hans Guenter Quix, Herzogenrath (DE); Jan Mehring, Cologne (DE); Herbert Ernst, Kerkrade (NL); Antonio Farina, Übach-Palenberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/413,522

(22) Filed: May 15, 2019

(65) Prior Publication Data

US 2019/0353087 A1    Nov. 21, 2019

(30) Foreign Application Priority Data

May 16, 2018    (DE) .................... 10 2018 207 621.9

(51) Int. Cl.
| | | |
|---|---|---|
| *F01P 7/14* | (2006.01) | |
| *F16K 31/12* | (2006.01) | |
| *F01P 11/16* | (2006.01) | |
| *F01P 7/16* | (2006.01) | |
| *F01P 11/18* | (2006.01) | |
| *F16K 1/54* | (2006.01) | |
| *F16K 49/00* | (2006.01) | |

(52) U.S. Cl.
CPC ............... *F01P 11/16* (2013.01); *F01P 7/16* (2013.01); *F01P 11/18* (2013.01); *F16K 1/54* (2013.01); *F16K 49/005* (2013.01); *F01P 2025/30* (2013.01)

(58) Field of Classification Search
CPC ...... F01P 11/16; F01P 11/18; F01P 2007/146; F01P 2025/30; F01P 2060/02; F01P 7/16; F02B 29/0443; F02B 29/0462; F16K 1/54; F16K 49/005; F16K 31/12; F16K 31/1262; F16K 31/3835; F16K 31/3855; F16K 11/0716; F16K 11/105; F16K 31/0641; F16K 31/0672; Y02T 10/12; F01N 2240/02; F01N 2610/1466; F04B 49/24
See application file for complete search history.

(56) References Cited

U.S. PATENT DOCUMENTS

| | | | |
|---|---|---|---|
| 5,404,842 A * | 4/1995 | Matsushiro | ............. F01P 7/167 123/41.1 |
| 2003/0221638 A1 | 12/2003 | Haase | |
| 2007/0197157 A1 | 8/2007 | Bellinger | |
| 2007/0199320 A1 | 8/2007 | Yager et al. | |

(Continued)

FOREIGN PATENT DOCUMENTS

| | | |
|---|---|---|
| DE | 102009014050 A1 | 9/2010 |
| DE | 102010001321 A1 | 8/2011 |

(Continued)

*Primary Examiner* — George C Jin
*Assistant Examiner* — Teuta B Holbrook
(74) *Attorney, Agent, or Firm* — Geoffrey Brumbaugh McCoy Russell LLP

(57) ABSTRACT

Methods and systems are provided for a control device for adjusting coolant flow. In one example, the control device may be shaped to receive charge air, engine coolant, and charge-air cooler coolant to adjust a flow of charge-air cooler coolant to a radiator.

5 Claims, 11 Drawing Sheets

(56) References Cited

U.S. PATENT DOCUMENTS

| | | |
|---|---|---|
| 2015/0247447 A1 | 9/2015 | Leroy et al. |
| 2017/0009642 A1 | 1/2017 | Kurtz et al. |
| 2019/0271995 A1* | 9/2019 | Arbel ................ G05D 23/1333 |

FOREIGN PATENT DOCUMENTS

| | | |
|---|---|---|
| DE | 102011087259 A1 | 5/2013 |
| DE | 202013101511 U1 | 6/2013 |
| DE | 102014207280 A1 | 10/2015 |
| DE | 102015216420 A1 | 3/2016 |
| DE | 102017200876 A1 | 5/2018 |
| GB | 2541006 A | 2/2017 |
| WO | 2007122345 A1 | 11/2007 |

* cited by examiner

| | 1 (none) | 2 (slight) | 3 (slight) | 4 (full) | 5 (full) |
|---|---|---|---|---|---|
| Cooling of charge air cooler | | | | | |
| Coolant pressure (dynamic speed of main pump) | e.g. < 0.3 bar | e.g. < 0.3 bar | e.g. > 0.3 bar < 0.6 bar | e.g. > 0.4 bar | not established |
| Coolant temperature | e.g. < 70° C | e.g. < 70° C | e.g. < 70° C | e.g. < 70° C | e.g. > 70° C |
| Charge pressure | e.g. < 0.2 bar | e.g. > 0.2 bar < 0.6 bar | e.g. < 0.2 bar | e.g. > 0.4 bar | not established |
| Valve position | closed | partially opened | partially opened | open | open |

FIG. 11

METHODS AND SYSTEMS FOR A CONTROL VALVE OF A CIRCUIT

CROSS REFERENCE TO RELATED APPLICATION

The present application claims priority to German patent application No. 102018207621.9, filed on May 16, 2018. The entire contents of the above-listed application are hereby incorporated by reference for all purposes.

FIELD

The present description relates generally to a control valve for adjusting coolant flow.

BACKGROUND/SUMMARY

Internal combustion engines may be equipped with turbochargers to increase the efficiency of the internal combustion engine. For further efficiency gains, the charge air compressed by a compressor of the turbocharger may be cooled, since charge air heated by the compression comprises a greater volume and hence has a lower density than cooled air. A corresponding charge air cooler may be connected to an assigned coolant circuit which is also designated a low-temperature coolant circuit. The low-temperature coolant circuit may comprise an electric pump via which the flow of coolant can be controlled. Efficient control may desire a complex control strategy and at least one additional temperature sensor in the low-temperature coolant circuit, which is complex and costly. Thus, there is a desire for a system able to control coolant flow to the charge air cooler with reduced packaging complexity.

In one example, the issues described above may be addressed by a system comprising a control valve shaped to adjust a flow of a low-temperature coolant from a cooler to a radiator in response to a charge pressure, an engine coolant pressure, or a temperature of the low-temperature coolant. In this way, the flow of coolant may be adjusted without complex electronic valves and/or control schemes.

As one example, the control valve comprises an upper chamber comprising a membrane positioned to receive boost air. The upper chamber may be further shaped to receive the engine coolant. Each of the membrane and the engine coolant may press on the closure to adjust a position of the closure to a partially open position or a fully open position. The upper chamber may be further shaped to receive an actuator which is actuated in response to a temperature sensed in a thermostat, wherein the actuator actuates into the upper chamber and presses against the closure to adjust a position of the closure to the fully open position. By adjusting the position of the closure to a partially open or fully open position, coolant from the charge air cooler may flow to a radiator, where a temperature of the coolant may decrease.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 11 illustrates a table depicting a correlation between the opening state of the control valve and associated parameters.

DETAILED DESCRIPTION

Figure 1:
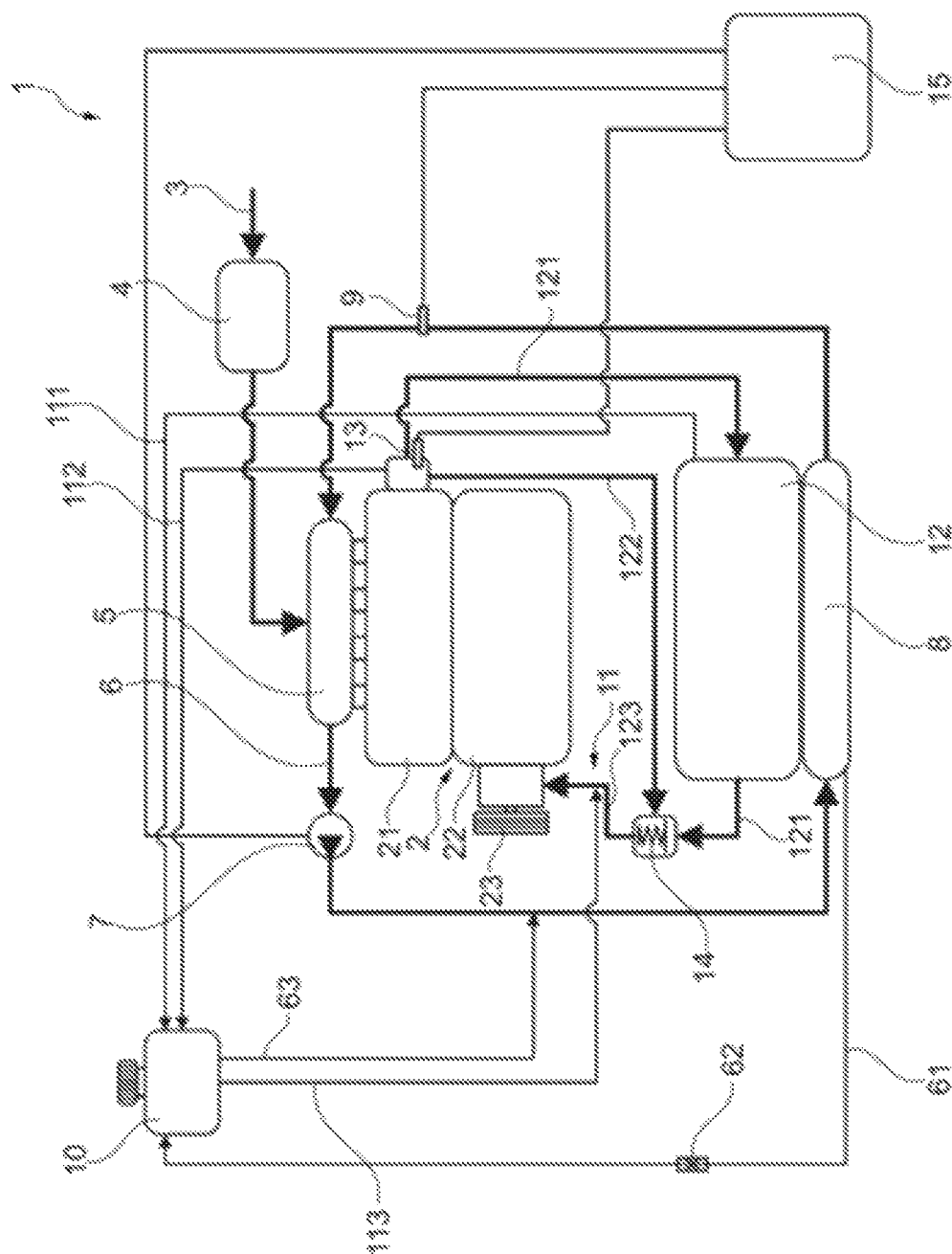
FIG. 1 illustrates a previous example of an arrangement of a charge-air cooling system.
Figure 2:
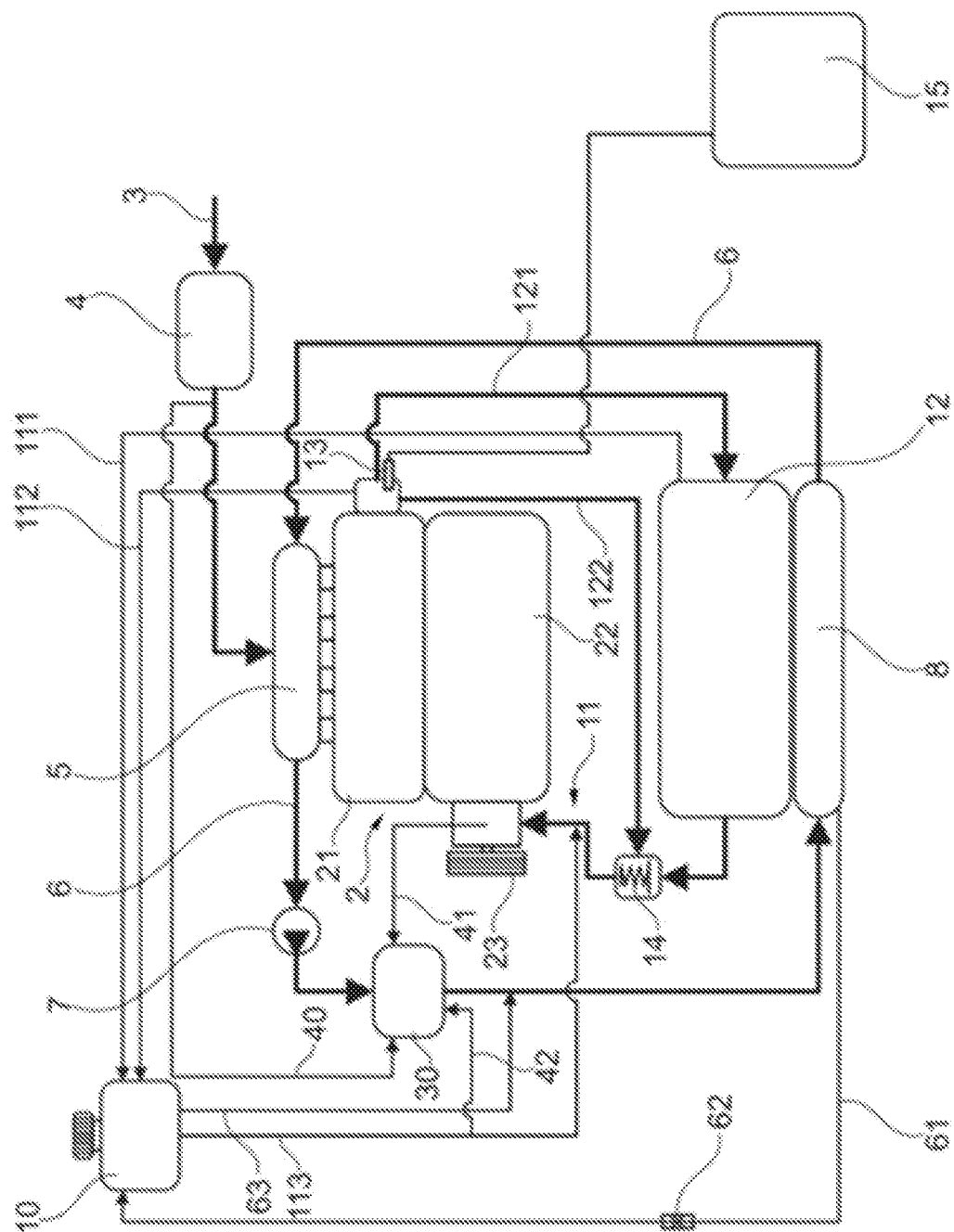
FIG. 2 illustrates an embodiment of a charge-air cooling system of the present disclosure.
Figure 3:
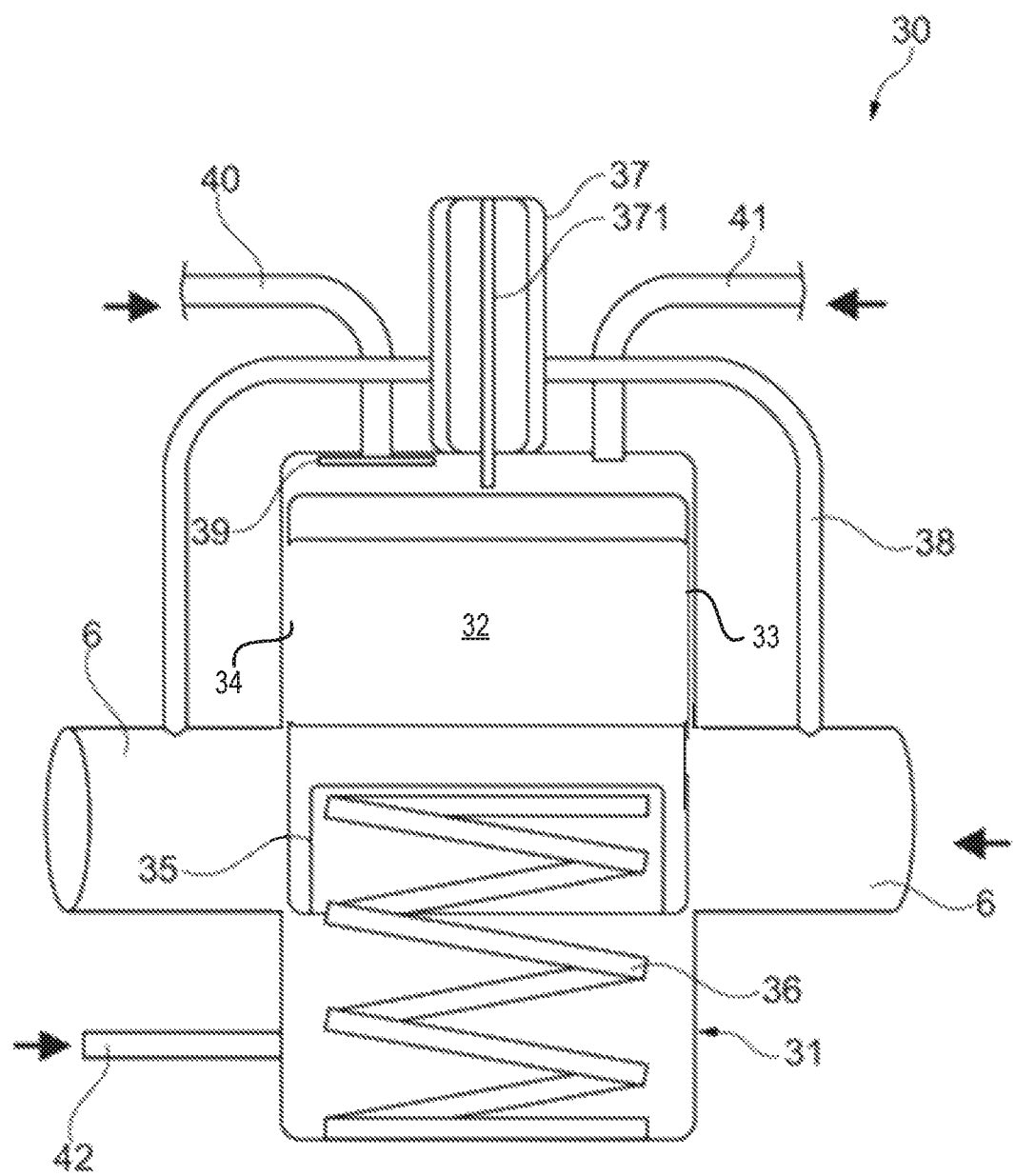
FIG. 3 illustrates a control valve in a first position.
Figure 4:
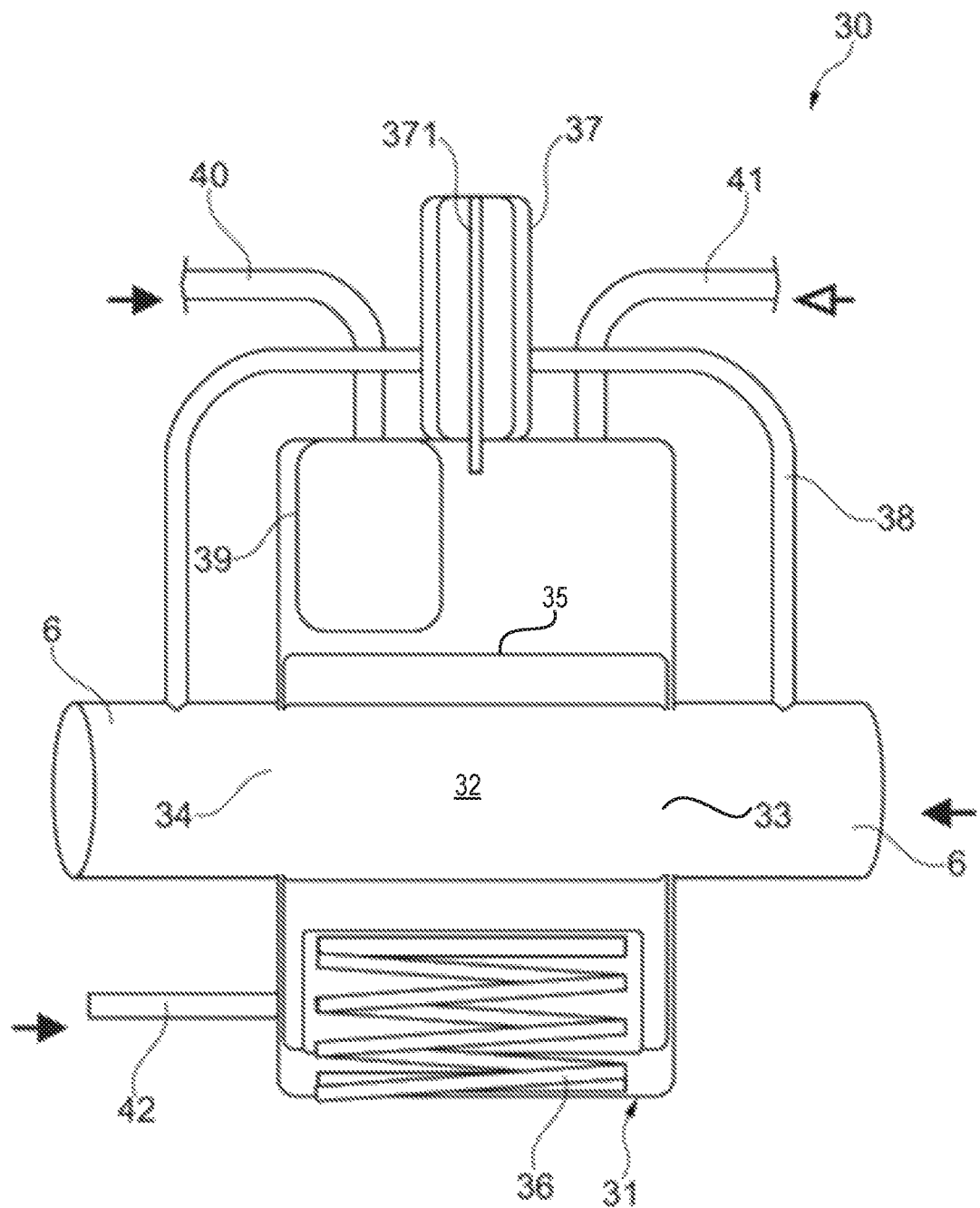
FIG. 4 illustrates the control valve in a second position.
Figure 5:
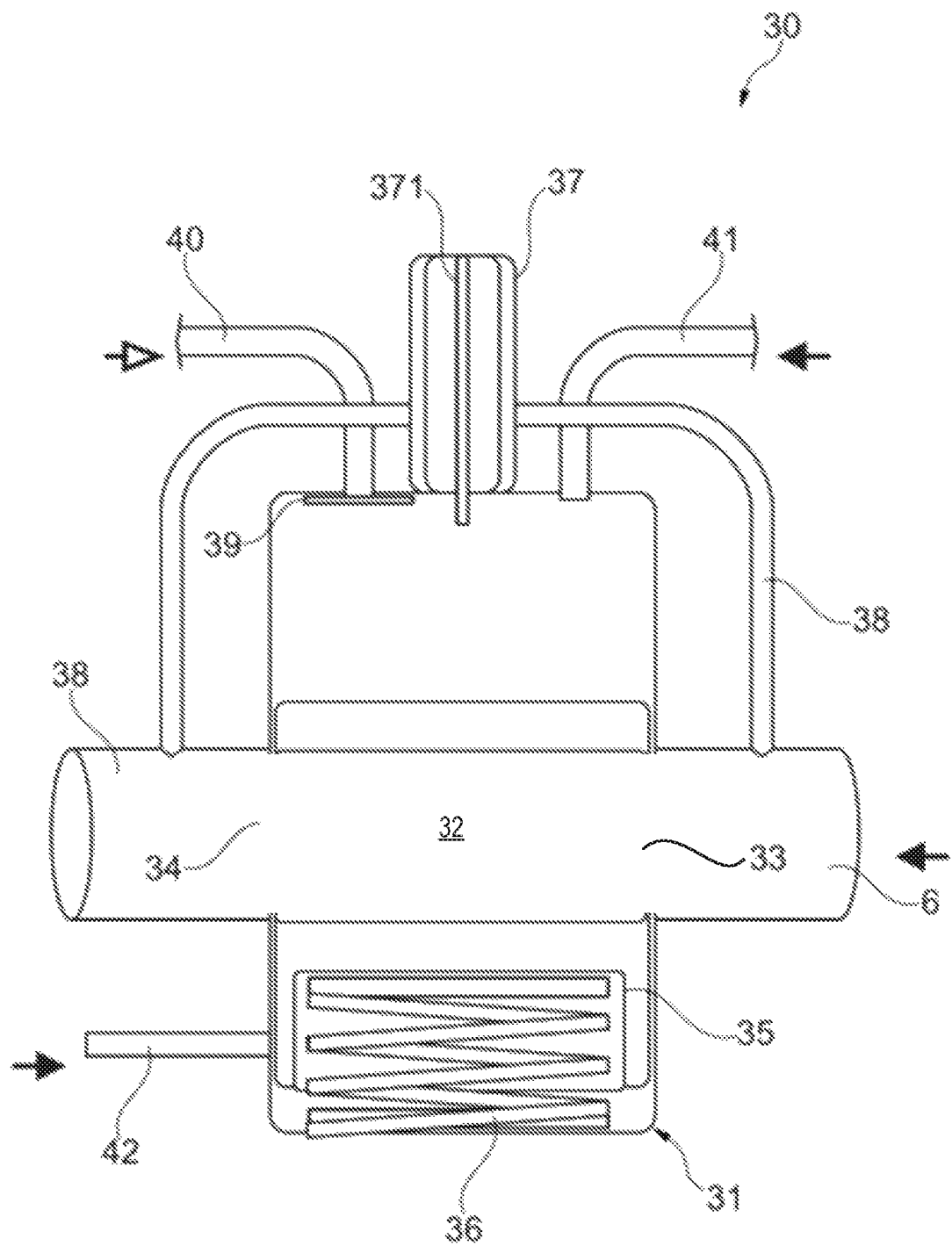
FIG. 5 illustrates the control valve in the second position.
Figure 6:
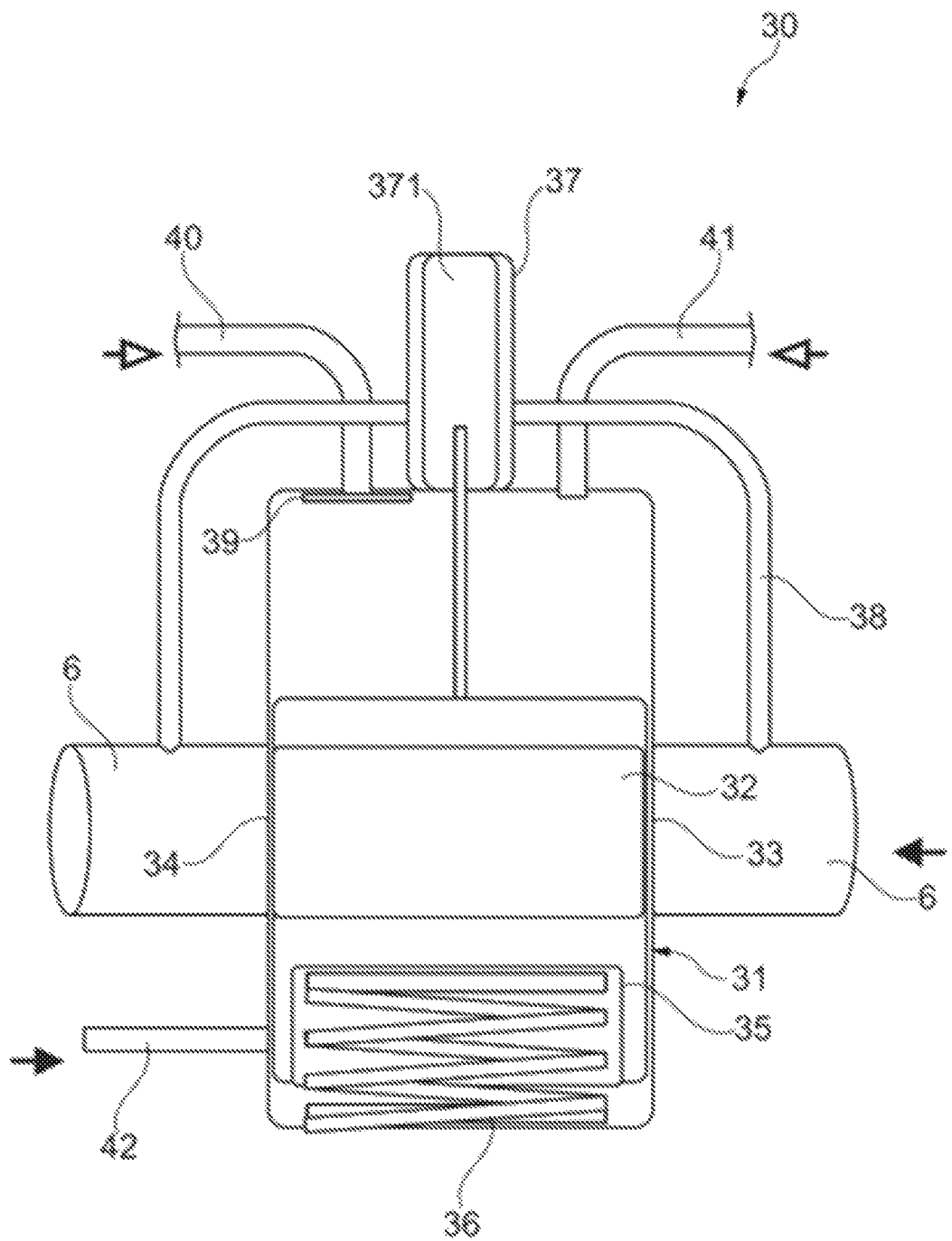
FIG. 6 illustrates the control valve in the second position.
Figure 7:
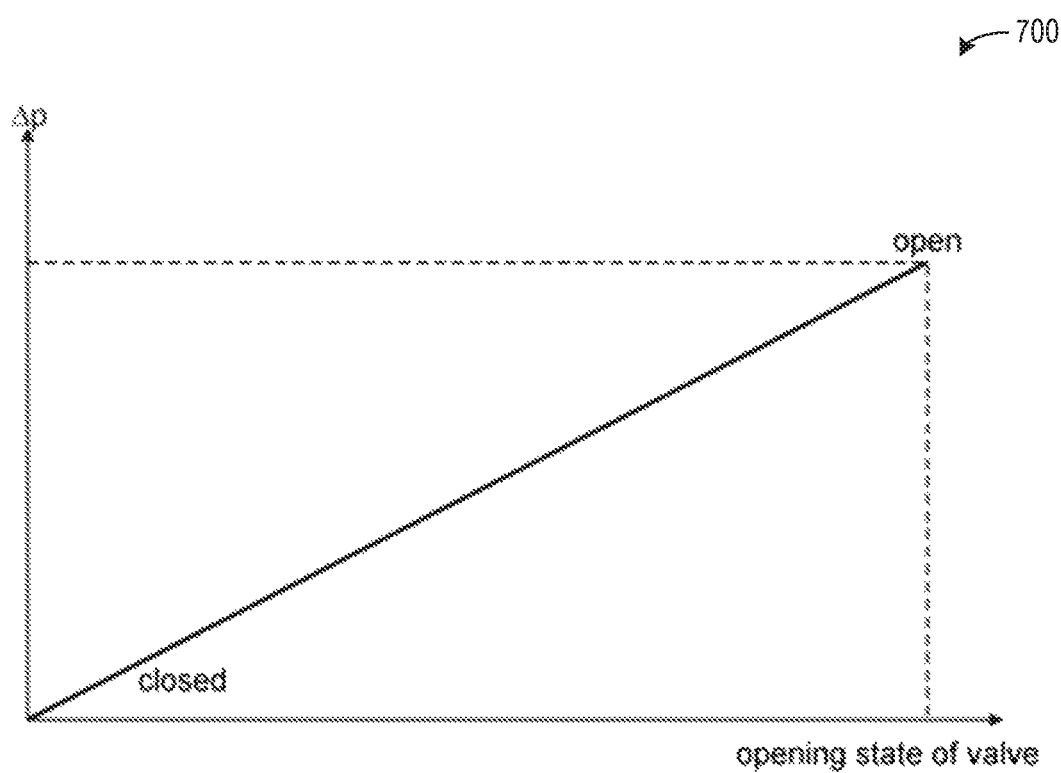
FIG. 7 illustrates a diagram showing the correlation between pressure and valve movement.
Figure 8:
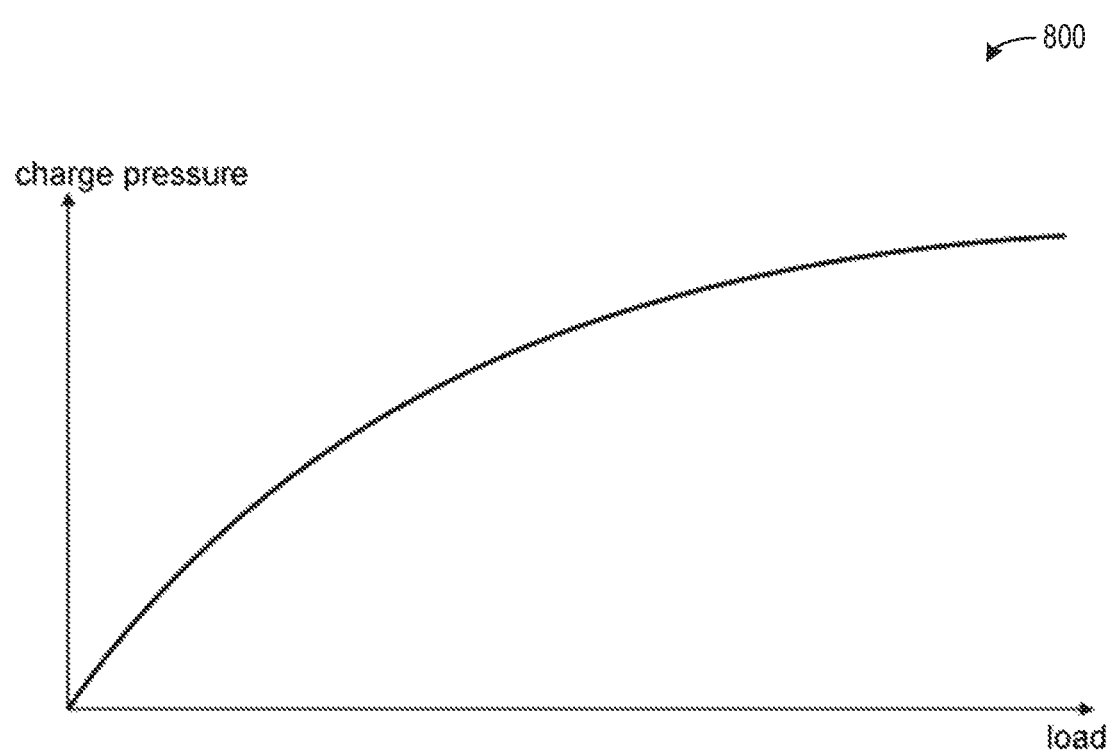
FIG. 8 illustrates a diagram showing the correlation between the load of the internal combustion engine and the charge pressure in the intake tract.
Figure 9:
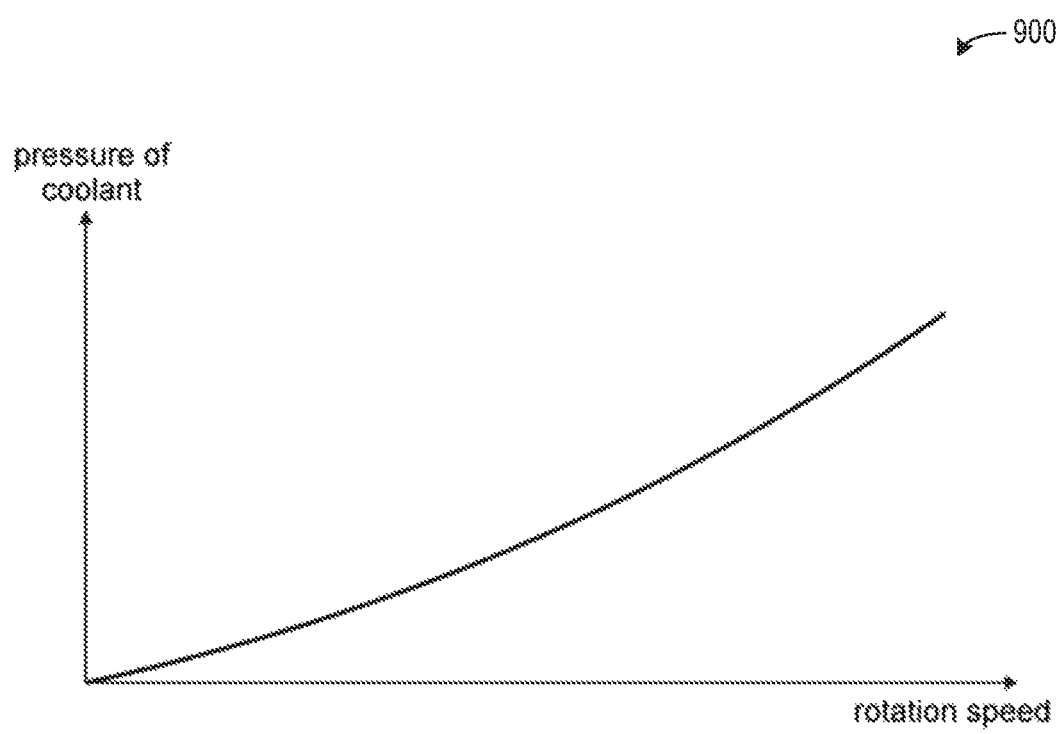
FIG. 9 illustrates a diagram showing the correlation between the rotation speed and the coolant pressure of the internal combustion engine.
Figure 10:
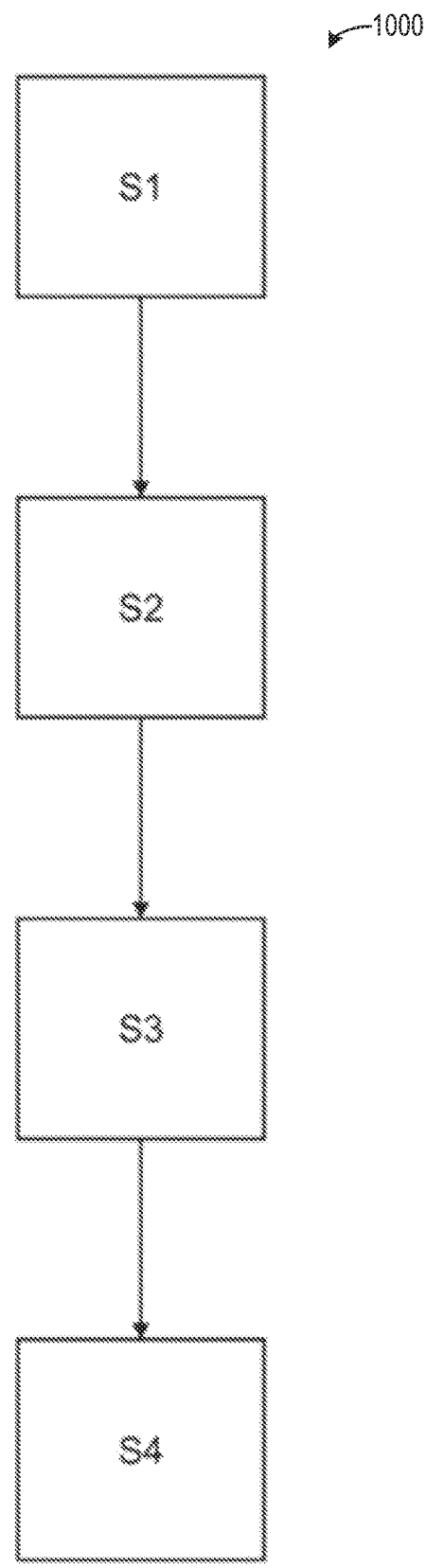
FIG. 10 illustrates a method for adjusting the control valve.

The following description relates to systems and methods for a control valve shaped to adjust coolant flow from a charge air cooler to a radiator in response to one or more of a boost pressure, an engine coolant pressure, and a charge air cooler coolant temperature. FIG. 1 illustrates a previous example of an arrangement of a charge-air cooling system. FIG. 2 illustrates an embodiment of a charge-air cooling system of the present disclosure. FIG. 3 illustrates a control valve in a first position. FIG. 4 illustrates the control valve in a second position. FIG. 5 illustrates the control valve in the second position. FIG. 6 illustrates the control valve in the second position. FIG. 7 illustrates a diagram showing the correlation between pressure and valve movement. FIG. 8 illustrates a diagram showing the correlation between the load of the internal combustion engine and the charge pressure in the intake tract. FIG. 9 illustrates a diagram showing the correlation between the rotation speed and the coolant pressure of the internal combustion engine. FIG. 10 illustrates a method for adjusting the control valve. FIG. 11 illustrates a table depicting a correlation between the opening state of the control valve and associated parameters.

A first embodiment of the disclosure comprises a control device for controlling the flow of a first fluidic medium in a line of a flow arrangement, comprising a housing having a flow path for the first fluidic medium with an inlet and an outlet, a closure for at least partially opening and closing the flow path, an inlet for at least one second fluidic medium, an inlet for at least one third fluidic medium, and a thermostat with a fluidic connection to the line of the first fluidic medium, wherein by the pressure of the second fluidic medium, the pressure of the third fluidic medium and the thermostat, the closure can be moved against the resistance of a closure spring so that the closure in a first working state closes and in a second working state at least partially opens the flow path of the first fluidic medium.

The control valve according to the present disclosure advantageously allows automatic control of the flow of the first fluidic medium. The inlets for the second and third fluidic medium and the thermostat are advantageously arranged on the same side of the control valve, so that from the same side, at least one force can be exerted on the closure in order to cause its movement against the spring force. The pressure of the second and third fluidic medium and the temperature of the first fluidic medium are described as parameters, on the basis of which the opening state of the control valve can be controlled.

Preferably, the first fluidic medium is a coolant of a low-temperature coolant circuit for a charge air cooler for an internal combustion engine of a vehicle. The coolant circuit for the charge air cooler is here known as the first coolant circuit or low-temperature coolant circuit. Via the control valve, advantageously the flow of coolant in the low-temperature coolant circuit of a charge air cooler can be controlled automatically.

Preferably, the inlet for the second fluidic medium has a fluidic connection to an intake tract of an internal combustion engine. The second fluidic medium is accordingly compressed charge air which branches off downstream of a compressor arranged in the intake tract of an internal combustion engine and is conducted to the control valve. The charge pressure is dependent on the load of the internal combustion engine. For example, if the load is higher, then the charge pressure is also higher. Thus advantageously a flow of a specific rate is possible depending on the charge pressure, in order at a comparatively high charge pressure to allow a cooling of the coolant in the low-temperature coolant circuit which is necessary at the high temperatures of the charge air associated with a high charge pressure.

Preferably, the inlet for the third fluidic medium has a fluidic connection to a coolant circuit of an internal combustion engine. The coolant circuit of the internal combustion engine is here known as the second or high-temperature coolant circuit. The corresponding connecting line branches off the high-temperature coolant circuit directly downstream of its main pump. In this way, the flow of the first fluidic medium is controlled depending on the pressure of the coolant in the high-temperature coolant circuit. Since the main pump for flow of the high-temperature coolant circuit is driven by the crankshaft of the internal combustion engine, the pressure of the coolant in the high-temperature coolant circuit depends on the rotation speed of the internal combustion engine. The control valve advantageously allows a faster outflow of the first fluidic medium when the internal combustion engine is running at high rotation speed. This cools the charge air more efficiently, and more (denser) charge air is available for combustion of fuel in the internal combustion engine.

It is particularly preferred if the control valve has a further inlet for the coolant of the internal combustion engine, via which a static pressure of the coolant of the internal combustion engine acts on the closure in order to compensate for a thermally induced pressure action of the coolant of the internal combustion engine on the closure. The inlet for the static pressure action is provided via a fluidic connection to a line from an expansion tank.

The thermostat of the control valve is connected to the line for the first fluidic medium through a leakage passage, in which a line of diameter smaller than the line of the first fluidic medium branches off this upstream of the control valve inlet and opens into this again downstream of the control valve outlet.

In a preferred embodiment of the control valve, exceeding a threshold value of one parameter is sufficient to open the closure. Also preferably, it may be necessary to exceed the threshold value of two parameters to open the closure. One parameter may enjoy priority over the other parameters, so that two parameters may cooperate but the third alone is sufficient. Preferably, the action of the thermostat has priority over the pressure of the second fluidic medium and the pressure of the third fluidic medium.

Preferably, the opening properties of the control valve are determined by the formation of the pressure-loaded surfaces of the closure and the force of the closure spring.

A second aspect of the present disclosure concerns an arrangement of an internal combustion engine with a charge air cooler in an intake tract which is connected to the first coolant circuit, wherein the internal combustion engine is connected to a second coolant circuit, and the first and the second coolant circuits are connected to a common expansion tank. To control the flow of coolant in the first coolant circuit, a control valve according to the present disclosure is arranged in the line of the first coolant, wherein the control valve for controlling the position of the closure has a fluidic connection to the intake tract, a fluidic connection to the second coolant circuit, a fluidic connection to the expansion tank, and a thermostat fluidly connected to the line of the first coolant.

The advantages of the arrangement correspond to the advantages of the control valve according to the disclosure. Particularly advantageously, the arrangement according to the disclosure allows a simple and robust control of a low-pressure coolant circuit for a charge air cooler.

The fluidic connection of the control valve to the intake tract branches off the intake tract downstream of the compressor of a turbocharger. The fluidic connection of the control valve to the second coolant circuit branches off the second coolant circuit downstream of the main pump.

The first and second coolants are advantageously identical so that the same expansion tank can be used with these. For example, a water-glycol mixture may be used both for the low-temperature and for the high-temperature coolant circuits.

A third aspect of the disclosure concerns a method for operating an arrangement according to the disclosure. The method may comprise operation of the internal combustion engine, wherein the control valve of the low-temperature coolant circuit is in a first working state and/or a first position in which the flow path of the first coolant circuit is closed. The method may further comprise opening of the closure at least partially by the pressure of the intake air when a specific first threshold value of the pressure of the intake air has been exceeded, so that the control valve is in a second working state, and/or opening of the closure at least partially by the pressure of the coolant in the high-temperature coolant circuit when a specific first threshold value of the pressure of the second coolant has been exceeded, so that the control valve is in a second working state, and/or opening of the closure at least partially by the action of the thermostat when a specific first threshold value for the temperature of the coolant in the first coolant circuit has been exceeded, so that the control valve is in a second working state.

Preferably, exceeding the threshold value of at least one parameter is sufficient to at least partially open the closure. In other words, preferably solely the pressure of the intake air or of the coolant in the second coolant circuit, or solely the temperature of the coolant in the first coolant circuit, is sufficient to open the control valve.

Preferably, the degree of opening of the closure depends on the height of the parameter value above the first threshold value. In this context, the concept of the first threshold value is used to set a correlation for opening the closure as distinct from the closed state. Further threshold values may be determined which correspond to various opening degrees of the closure. For example, the first threshold value may lead to a 50% opening and a second threshold value to a complete (100%) opening of the closure.

FIGS. 3-6 show example configurations with relative positioning of the various components. If shown directly contacting each other, or directly coupled, then such elements may be referred to as directly contacting or directly coupled, respectively, at least in one example.

Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a conventional arrangement 1 of an internal combustion engine 2 with an intake tract 3 which is provided to supply charge air to the internal combustion engine 2. Downstream of a compressor 4, which is part of a turbocharger, a cooler 5 is arranged in the intake tract 3 for cooling the charge air. The charge air cooler 5 is connected to a first coolant circuit 6, also known as the low-temperature coolant circuit 6. An electric pump 7, a first cooling radiator 8 for cooling the coolant, and a first temperature sensor 9 are arranged in the low-temperature coolant circuit 6. The coolant used is e.g. a water-glycol mixture. The low-temperature coolant circuit 6 is connected to an expansion tank 10 via a first expansion line 61 containing a through-flow limiter 62, and a first supply line 63.

From the charge air cooler 5, the charge air is conducted to the cylinder head 21 of the internal combustion engine 2. The cylinder head 21 is connected to the cylinder 22. The cylinder 22 contains the piston, the longitudinal movement of which caused by the combustion of fuel is converted into a rotational movement of a crankshaft.

The internal combustion engine is connected to a second coolant circuit 11, which is also known as a high-temperature coolant circuit 11. The flow of the high-temperature coolant circuit 11 is caused by the main pump 23 which is driven by the crankshaft of the internal combustion engine 2. The pressure of the coolant of the high-temperature coolant circuit 11, e.g. a water-glycol mixture, thus stands in a functional correlation with the rotation speed of the internal combustion engine 2 (see FIG. 8). The same coolant, e.g. a water-glycol mixture, is used in the low-temperature coolant circuit 6 and in the high-temperature coolant circuit 11. A second cooling radiator 12 and a second temperature sensor 13 are arranged in the high-temperature coolant circuit 11. The cooling fluid may, depending on its temperature, either be conducted through the second cooling radiator 12 via a first partial line 121 or bypass this via a second partial line 122. To control the flow of cooling fluid, a three-way valve 14 is provided at which the partial lines 121, 122 merge into a common line 123. The second coolant circuit 11 is also connected to the expansion tank 10 via the second expansion line 111, third expansion line 112 and second supply line 113.

The first and second temperature sensors 9, 13 are connected to a control device 15. The control device is connected to the electric pump 7. Depending on the temperature of the respective cooling fluid in the low-temperature coolant circuit 6 and in the high-temperature coolant circuit 11, the electric pump 7 is switched on or its line activated via a control command from the control device 15.

Control device 15 (interchangeably referred to herein as controller 15) is shown in FIG. 1 as a microcomputer which may include one or more of a microprocessor unit, input/output ports, a read-only memory, a random access memory, a keep alive memory, and a conventional data bus. Controller 15 is shown receiving various signals from sensors coupled to engine 2.

Turning now to FIG. 2, it shows an embodiment of an arrangement 1 according to the disclosure. In comparison with FIG. 1, the arrangement 1 has a control device 30 which is arranged in the low-temperature coolant circuit 6. The control device 30 has a connection to the intake tract via a charge pressure control inlet 40, which connection branches off the intake tract 3 downstream of the compressor 4. The opening state of the control valve 30 is controlled depending on charge pressure via the charge pressure control inlet 40. Furthermore, the control valve 30 has a connection to the high-temperature coolant circuit 11 via a coolant pressure control inlet 41. Via the coolant pressure control inlet 41, the opening state of the control valve 30 is controlled depending on the pressure of the coolant in the high-temperature coolant circuit 11. Furthermore, the control valve 30 has a connection to the line 113 via a coolant pressure compensation inlet 42, which line leads from the expansion tank 10 to the high-pressure coolant circuit 11. A pressure rise in the high-temperature coolant circuit 11 caused by a temperature rise of the coolant is compensated via the coolant pressure compensation inlet 42.

Turning now to FIG. 3, it shows an embodiment of the control valve 30 according to the invention. The control valve 30 has a cylindrical housing 31, wherein the shape of the housing may also be designed differently. A tunnel 32 leads through the control valve 30 and conducts the coolant of the low-temperature coolant circuit 6. The tunnel 32 has an inlet 33 and outlet 34. The solid arrows in FIGS. 3 to 6 show the pressures which are active in the situation shown, whereas the outlined arrows show the pressures which are not active in the situation shown.

The housing 31 contains a closure 35. The closure 35 is pressed upward by the force of a spring 36, i.e. in the direction of the control inlets 40 and 41. In this way, the control valve 30 is held in a closed position as shown in FIG. 3. The tunnel 32 leading through the valve 30 is here blocked. When the closure 35 is pressed upward by the spring 36, it may occupy an upper chamber of the valve adjacent to the control inlets 40 and 41 in a first position (e.g., the closed position). The upper chamber may receive a second coolant from the coolant pressure control inlet 41, wherein the coolant in the upper chamber is fluidly separated from the tunnel 32. Furthermore, the tunnel 32 may fluidly connect the first coolant circuit 6 when the closure moves to a position outside of the first position, as shown in FIGS. 4-6.

On the top of the housing, the charge pressure control inlet 40 and the coolant pressure control inlet 41 open into the housing 31. Above specific threshold values, the charge pressure and coolant pressure exert a sufficient pressure on the closure 35 to overcome a force of the spring 36 and move the closure 35 away from the upper chamber out of the first position to a partially open position or a fully open position.

A thermostat 37 is also arranged on the top of the housing 31. Downstream of the control valve 30, a leakage passage 38 branches off the line of the first coolant circuit 6. The leakage passage 38 creates a fluidic connection from the first coolant circuit 6 to the thermostat 37. The thermostat 37 detects the temperature of the coolant in the first coolant circuit 6 and, depending on the temperature of the coolant in the first coolant circuit 6, exerts a force on the closure 35 to control the opening state of the control valve 30. The leakage passage 38 opens again into the line of the first coolant circuit 6 downstream of the control valve 30.

A membrane 39, on which a pressure of the charge air acts, is arranged in the control valve 30 in the region of the opening of the charge pressure control inlet 40. Above a specific threshold value of the charge pressure, the membrane 39 is stretched and the closure 35 is thereby moved against a force of the spring. The membrane 39 may comprise a collapsible material with a high durability. In one example, the material may be a polymer or other similar material.

Turning now to FIG. 4, it shows the control valve 30 in an opened state. The closure 35 is pressed down against the force of the spring 36 by the action of the charge pressure, so that the tunnel 32 is opened and coolant from the first coolant circuit 6 can flow through the control valve 30. The tunnel 32 is shown fully open. It is evident that the membrane 39 is stretched. Depending on the level of the charge pressure, the control valve 30 may also only be partially opened, wherein then the quantity of through-flowing coolant is limited. The opening state of the control valve 30 correlates to the pressure Δp, as shown in FIG. 7. The charge pressure is dependent on the amount of load on the internal combustion engine 2, as shown via graph 800 of FIG. 8.

In the example of the FIG. 4, the membrane 39 fills a portion of the upper chamber of the control valve 30, thereby forcing the closure 35 downward against the force of the spring 36. The membrane 39 is shown in a fully inflated position, wherein the membrane 39 is filled with hot boost air and expands to its greatest volume. This may correspond with a fully open position of the control valve, wherein engine speeds are relatively low and engine load is relatively high. It will be appreciated that the inflation of the membrane may be adjusted to volumes less than the greatest volume. In this way, the control valve 30 may be adjusted to a partially open position (e.g., a position between the closed position illustrated in FIG. 3 and a current position depicted in FIG. 4). In the partially open position, the tunnel 32 may be partially aligned with the first coolant circuit 6 such that its inlet 33 and its outlet 34 do not fully align with openings of the first coolant circuit 6. In this way, a flow rate through the tunnel 32 in the partially opened position may be less than a flow rate in the fully opened position. In one example, the flow rate through the tunnel 32 is proportional to an alignment between the tunnel 32 and the first coolant circuit 6, wherein as the tunnel 32 is more aligned, the flow rate increases.

Turning now to FIG. 5, it shows the control valve 30 is again shown in an open state. The closure 35 is here pressed down against the force of the spring 36 by the action of the coolant pressure of the second coolant circuit 11. Here again, the tunnel 32 is shown fully open, so that the coolant from the first coolant circuit 6 can flow unhindered through the control valve 30. Depending on the level of said coolant pressure, the control valve 30 may also only be partially opened, wherein then the quantity of through-flowing coolant is limited. The effect of the coolant pressure is limited by the static coolant pressure created by the coolant pressure compensation inlet 42, so that only the pressure of the coolant of the second coolant circuit 11 created by the effect of the main pump 23 has an influence on the movement of the closure 35, and not the pressure increase due to temperature. The opening state of the control valve 30 here correlates to the pressure Δp, in concrete terms to the pressure difference Δp from the pressure of the coolant in the second coolant circuit 11, as shown via graph 700 of FIG. 7. The pressure difference is dependent on the rotation speed of the internal combustion engine 2, as shown via graph 900 of FIG. 9.

In the example of FIG. 5, coolant from the second coolant circuit 11 fills at least a portion of the upper chamber and presses against the closure 35 and overcomes a force of the spring 36. In the example of FIG. 5, the closure 35 is in the fully open position, where the tunnel 32 is completely aligned with the first coolant circuit 6. In one example, the fully open position of FIG. 5 is substantially identical to the fully open position of FIG. 6. Similar to the membrane 39, the coolant from the second coolant circuit 11 may adjust an alignment of the tunnel 32 with the first coolant circuit 6. For example, if less coolant from the second coolant circuit 11 enters the upper chamber, then the closure 35 may compress the spring 36 less and the alignment between the tunnel 32 and the first coolant circuit 6 may also decrease, thereby resulting in less coolant flow to the charge air cooler 5.

While the positions of the control valve 30 in FIGS. 4 and 5 are similar, engine conditions leading to the positions are different. As described above, the position shown in FIG. 4 may occur in response to a low engine speed and high engine load. The position shown in FIG. 5 may result from a high engine speed and a low engine load. In some examples, the membrane 39 may be partially filled while the coolant from the coolant pressure control inlet 41 presses against the closure 35. At any rate, the greater of the two forces, between the membrane 39 and the coolant from the coolant pressure control inlet 41 may set the position of the control valve 30.

In both FIGS. 4 and 5, coolant from the expansion tank 10 flows into a lower chamber of the control valve 30. The lower chamber may be fluidly separated from the upper chamber via the closure 35. Additionally, the lower chamber may be fluidly separated from the tunnel 32 so that coolant in the tunnel does not mix with coolant in the lower chamber. The coolant in the lower chamber may comprise a temperature based on an ambient temperature and other thermal conditions that may adjust a pressure of the coolant. Thus, the difference between the coolant entering the upper chamber via the coolant pressure control inlet 41 and the coolant entering the lower chamber via the coolant pressure compensation inlet 42 is that the coolant entering the upper chamber is pressurized via the main pump 23. By flowing coolant that is unaffected by the pump 23 into the lower chamber, the coolant in the lower chamber may negate thermal changes to the coolant entering the upper chamber, thereby allowing only static pressure to actuate the closure 35. In this way, coolant in the upper chamber may press against the force of the spring and the force of the coolant in the lower chamber. Additionally, charge air filling the membrane may also press against the closure to overcome the force of the spring and thermal changes to the coolant due to ambient conditions and the like.

Turning now to FIG. 6, it shows the control valve 30 is again shown in the opened state. Here, the closure 35 is caused by the action of the thermostat 37. When a specific threshold value for the temperature of the coolant of the first coolant circuit 6 is exceeded, which is detected by the thermostat 37, an actuator 371 of the thermostat 37 is actuated which presses the closure 35 down against the force of the spring 36. Here again, the tunnel 32 is opened so that the coolant of the first coolant circuit 6 can flow through the control valve 30. Depending on the temperature of the coolant, the control valve 30 may also only be opened partially, wherein then the quantity of through-flowing coolant is limited.

Said partial openings are also controlled by various threshold values of the individual parameters described, so that a specific opening degree of the control valve 30 corresponds to reaching a specific value (further threshold value) of the charge pressure, the pressure of the coolant in the second coolant circuit 11, and/or the temperature of the coolant in the first coolant circuit 6. It is left to the person skilled in the art to adjust the control valve according to the threshold values depending on the actual values prevailing in the system.

For example, when the membrane is filled with charge air, if the charge air pressure is greater than a first threshold charge pressure and less than a second threshold charge pressure, then the closure may be moved to a partially opened position, wherein the partially opened position is more open as the charge pressure approaches the second threshold charge pressure. If the charge pressure exceeds or is equal to the second threshold charge pressure, then the closure is moved to the fully opened position. In this way, the closure may be moved within a range between the fully closed and fully opened positions, wherein a plurality of partially open positions exist between the fully open and fully closed positions. A more open position of the partially open positions may more closely resemble the fully open position than the fully closed position, and a more closed position of the partially open positions may more closely resemble the fully closed position than the fully open position.

In the fully open position, the tunnel is completely aligned with the separated portions of the first coolant circuit 6 so that a coolant flow rate therethrough reaches a highest coolant flow rate and the charge air cooler coolant is cooled in the radiator. In the partially open positions, the tunnel may be only partially aligned with the separated portions of the first coolant circuit 6 so that a coolant flow rate is less than the highest coolant flow rate. In the closed position, the tunnel is completely misaligned with the separated portions of the first coolant circuit 6 so that the coolant flow rate is zero and the charge air cooler coolant is not cooled in the radiator.

As another example, the coolant from the coolant pressure control inlet 41, which is pressurized by the main pump 23 based on at least an engine speed, may move the closure to a partially open position of a plurality of partially open positions if the pressure of the coolant is greater than or equal to a first threshold coolant pressure and less than a second threshold coolant pressure. If the coolant pressure is greater than or equal to the second threshold coolant pressure, then the closure may be moved to the fully open position.

As a further example, if either of the charge pressure or the engine coolant is equal to a pressure that actuates the closures to a partially open position while a charge air cooler coolant temperature is greater than a threshold coolant temperature, then the actuator of the thermostat moves the closure to the fully opened position. In this way, the charge air cooler coolant temperature may be prioritized over the charge air pressure and engine coolant pressure.

It will be appreciated that if the temperature of the coolant from the second coolant circuit 11 is high enough to actuate the actuator 371 of the thermostat 37, then the actuator 371 may set the position of the closure 35 independent of the membrane 39 and coolant in the upper chamber from the coolant pressure control inlet 41. As such, when the charge air cooler coolant temperature exceeds a threshold temperature such that the actuator 371 is actuated, then the tunnel 32 is fully aligned with the first coolant circuit 6 to provide a highest flow rate to allow more charge air cooler coolant to flow to the radiator.

Turning now to FIG. 10, it illustrates a method for adjusting a position of the closure in the control valve. In a first step S1 the internal combustion engine 2 is operated. The load and rotation speed of the internal combustion engine 2 are low, so that neither the charge pressure nor the coolant pressure in the second coolant circuit 11 rise beyond corresponding predefined threshold values. The control valve 30 is closed (FIG. 3) so that the flow path of the first coolant circuit 6 is closed. In other words, no coolant flows through the first coolant circuit so that the charge air cooler 5 is not cooled.

In a second step S2, the closure 35 is pressed down against the force of the spring 36 by the pressure of the compressed intake air (charge pressure) after a specific threshold value of the charge pressure has been exceeded. The control valve 30 is now opened (FIG. 4). According to FIG. 4, the control valve is fully opened so that the coolant in the first coolant circuit can flow with full force and the charge air cooler 5 is cooled with high efficiency. The cooling radiator 8 is also activated if not already activated.

In a third step S3, the closure 35 is pressed down against the force of the spring 36 by the coolant pressure of the second coolant circuit provided by the power of the main pump 23 after a specific threshold value of the coolant pressure has been exceeded. The control valve 30 is opened (FIG. 5). According to FIG. 5, the control valve is fully opened so that the coolant in the first coolant circuit can flow with full force and the charge air cooler 5 is cooled with high efficiency. The cooling radiator 8 is also activated if not already activated.

In a fourth step S4, the closure is pressed down against the force of the spring 36 by the action of the thermostat if a specific threshold value of the coolant temperature in the first coolant circuit has been exceeded. The control valve 30 is opened (FIG. 6). According to FIG. 6, the control valve is fully opened so that the coolant in the first coolant circuit can flow with full force and the charge air cooler 5 is cooled with high efficiency. The cooling radiator 8 is also activated if not already activated. As will be appreciated, when the charge air coolant temperature exceeds the threshold temperature, then the closure may be actuated to the fully open position independent of the charge air pressure and the engine coolant pressure.

Steps S2-S4 may be performed in parallel, i.e. simultaneously, or temporally overlapping. Thus the control valve 30 is in any case opened when certain threshold values of all said parameters are exceeded. The control valve 30 may be set such exceeding the threshold value of one parameter is sufficient to press the closure 35 down. In particular, the temperature of the coolant in the first coolant circuit 6 is used here as the sole adequate parameter. The control valve may also be set such that two parameters may cooperate to press down the closure 35, wherein in particular the charge pressure and the coolant pressure in the second coolant circuit 11 are used as corresponding parameters.

FIG. 11 explains in table form, via table 1100, some exemplary situations in which the control valve 30 has different opening states depending on the parameters of charge pressure, coolant pressure in the second coolant circuit 11, and coolant temperature in the first coolant circuit.

According to FIG. 11, the control valve 30 is closed i.e. no coolant flows in the first coolant circuit when the coolant temperature lies below 70° C., the coolant pressure below 0.3 bar, and the charge pressure below 0.2 bar (column 1). Said values are known as first threshold values.

If some of these are exceeded, the control valve 30 is partially opened, i.e. between 0 and 100%, in particular however to a part of up to 20%, quite particularly 10%. This occurs e.g. with the values in column 2, in which the coolant temperature lies below 70° C. and the coolant pressure below 0.3 bar, but the charge pressure is between 0.2 and 0.6 bar. Similarly, the control valve 30 is partially opened when, as shown in column 3, the coolant temperature lies below 70° C. and the charge pressure below 0.2 bar, but the coolant pressure is between 0.2 and 0.6 bar. Thus 0.6 bar could be regarded as the second threshold value for the charge pressure and coolant pressure, wherein the control valve 30 is fully open when these respective values are exceeded.

The control valve 30 is fully opened if the coolant temperature still lies below 70° C. but the charge pressure and coolant pressure both exceed a value of 0.4 bar (column 4). This situation could also be defined as a threshold value.

The control valve 30 is also fully opened if the temperature exceeds its first threshold value of 70° C. (column 5). As evident from column 5, the two other parameters here are insignificant if the temperature of the coolant in the first coolant circuit exceeds the set (first) threshold value.

In this way, a control valve for adjusting charge air coolant flow may be adjusted without electronic components. The technical effect of adjusting the control valve without electronic components is to decrease a manufacturing cost of a coolant circuit for a turbocharged engine. The control valve may be adjusted in response to one or more of a charge pressure, an engine coolant pressure, and a charge air cooler coolant temperature.

An embodiment of a control device for controlling the flow of a first fluidic medium in a line of a flow arrangement, comprising a housing having a flow path for the first fluidic medium with an inlet and an outlet, a closure for at least partially opening and closing the flow path, an inlet for at least one second fluidic medium, an inlet for at least one third fluidic medium, and a thermostat with a fluidic connection to the line of the first fluidic medium, wherein by the pressure of the second fluidic medium, the pressure of the third fluidic medium and an actuator of the thermostat, the closure can be moved against the resistance of the closure spring, so that the closure in a first working state closes and in a second working state at least partially opens the flow path of the first fluidic medium.

A first example of the control device further comprises where the first fluidic medium is a coolant of a low-temperature coolant circuit for a charge air cooler for an internal combustion engine of a vehicle.

A second example of the control valve, optionally includes the first example, further comprises where the inlet for the second fluidic medium has a fluidic connection to an intake tract of an internal combustion engine.

A third example of the control valve, optionally including any of the previous examples, further comprises where the inlet for the third fluidic medium has a fluidic connection to a high-temperature coolant circuit of an internal combustion engine.

A fourth example of the control valve, optionally including any of the previous examples, further comprises where the control valve has a further inlet for the coolant of the internal combustion engine, via which a static pressure of the coolant of the internal combustion engine acts on the closure in order to compensate for a thermally induced pressure action of the coolant of the internal combustion engine on the closure.

A fifth example of the control valve, optionally including any of the previous examples, further comprises where the action of the thermostat has priority over the pressure of the second fluidic medium and the pressure of the third fluidic medium.

A sixth example of the control valve, optionally including any of the previous examples, further comprises where the opening properties of the control valve are determined by the formation of the pressure-loaded surfaces of the closure and the force of the spring of the closure.

An arrangement of an internal combustion engine with a charge air cooler in an intake tract, which is connected to the first coolant circuit, wherein the internal combustion engine is connected to a second coolant circuit, the first and the second coolant circuits are connected to a common expansion tank, wherein to control the flow of coolant in the first coolant circuit, a control valve of any of the previous examples is arranged in the arrangement, and wherein the control valve for controlling the position of the closure has a connection to the intake tract, a connection to the second coolant circuit, a connection to the expansion tank, and a thermostat fluidly connected to the line of the first coolant.

A method for operating the arrangement comprises operation of the internal combustion engine, wherein the control valve of the first coolant circuit is in a first working state in which the flow path of the first coolant circuit is closed, opening of the closure at least partially by the pressure of the intake air when a specific threshold value of the pressure of the intake air has been exceeded, so that the control valve is in a second working state, and/or opening of the closure at least partially by the pressure of the coolant of the second coolant circuit when a specific threshold value of the pressure of the coolant in the second coolant circuit has been exceeded, so that the control valve is in a second working state, and/or opening of the closure at least partially by the action of the thermostat when a specific threshold value for the temperature of the coolant in the first coolant circuit has been exceeded, so that the control valve is in a second working state.

A first example of the method further comprises where exceeding of a threshold value for at least one parameter is sufficient to at least partially open the closure.

A second example of the method, optionally including the first example, further includes where the degree of opening of the closure depends on the height of the parameter value above the threshold value.

A system comprising a control valve shaped to adjust a flow of a low-temperature coolant from a cooler to a radiator in response to a charge pressure, an engine coolant pressure, or a temperature of the low-temperature coolant.

A first example of the system further comprises where the cooler is fluidly coupled to the radiator via a coolant circuit, and where the control valve comprises a closure with a tunnel, wherein the tunnel may partially or fully complete the coolant circuit in some positions of the closure.

A second example of the system, optionally including the first example, further comprises where the closure is actuated via one or more of a spring, a membrane, an actuator of a thermostat, and an engine coolant entering an upper chamber of the control valve.

A third example of the system, optionally including one or more of the previous examples, further comprises where the spring actuates the closure to a fully closed position in response to the charge pressure being less than a first threshold charge pressure, the engine coolant pressure being less than a first threshold coolant pressure, and the temperature of the low-temperature coolant being less than a threshold temperature, wherein the fully closed position comprises the tunnel being completely misaligned with the coolant circuit.

A fourth example of the system, optionally including one or more of the previous examples, further comprises where the membrane presses against and actuates the closure in response to the charge pressure being greater than or equal to a first threshold charge pressure, wherein the membrane at least partially fills with charge air and occupies at least a portion of the upper chamber, wherein the closure compresses the spring when the membrane is at least partially filled and the tunnel at least partially aligns with the coolant circuit to flow coolant from the cooler to the radiator.

A fifth example of the system, optionally including one or more of the previous examples, further comprises where the engine coolant presses against and moves the closure against a force of the spring in response to the engine coolant pressure being greater than or equal to the first threshold coolant pressure, wherein the tunnel at least partially aligns with the coolant circuit to flow coolant from the cooler to the radiator.

A sixth example of the system, optionally including one or more of the previous examples, further comprises where engine coolant in the upper chamber does not mix with low-temperature coolant in the tunnel and coolant circuit.

A seventh example of the system, optionally including one or more of the previous examples, further comprises where the control valve is fluidly coupled to a coolant pressure compensation inlet, wherein the coolant pressure compensation inlet directs engine coolant from an expansion tank to a lower chamber of the control valve, wherein the engine coolant in the lower chamber presses against the closure in a direction parallel to the force of the spring, and where the engine coolant entering the upper chamber is directed by a pump, wherein engine coolant in the upper chamber does not mix with engine coolant in the lower chamber, wherein engine coolant in the lower chamber does not mix with low-temperature coolant in the tunnel.

An eighth example of the system, optionally including one or more of the previous examples, further comprises where actuator presses against the closure in response to a temperature of the low-temperature coolant exceeding the threshold temperature, wherein the actuator presses against the closure and actuates the closer to a fully open position where the tunnel is fully aligned with the coolant circuit.

A ninth example of the system, optionally including one or more of the previous examples, further comprises where the cooler is a charge air cooler.

An embodiment for a turbocharged engine, comprises a control valve shaped to adjust coolant flow in a coolant passage fluidly connecting a charge air cooler to a radiator, wherein the control valve comprises a closure that is moveable in response to a force in an upper chamber of the control valve overcoming a force of a spring coupled to the closure, wherein a tunnel of the closure fluidly connects separated portions of the coolant passage when the force of the spring is overcome.

A first example of the turbocharged engine further comprises where the control valve comprises a membrane comprising a collapsible material, wherein the membrane is fluidly coupled to a charge pressure control inlet, wherein the membrane actuates the closure to a partially open position in response to a charge pressure being greater than or equal to a first threshold charge pressure and less than a second threshold charge pressure, wherein the partially open position comprises partially aligning the tunnel with the coolant passage, wherein the membrane actuates the closure to a fully open position in response to the charge pressure being greater than or equal to the second threshold charge pressure, wherein the fully open position comprises the tunnel being completely aligned with the coolant passage.

A second example of the turbocharged engine, optionally including the first example, further comprises where the control valve comprises a coolant pressure control inlet shaped to flow an engine coolant directed by a main pump into an upper chamber of the control valve, wherein the control valve further comprises a coolant pressure compensation inlet shaped to flow an engine coolant from an expansion tank to a lower chamber of the control valve, wherein the upper chamber and the lower chamber are fluidly separated via the closure, wherein the closure is moved to a partially open position in response to a coolant pressure of coolant in the upper chamber being greater than or equal to a first threshold coolant pressure and less than a second threshold coolant pressure, wherein the closure is moved to a fully open position in response to the coolant pressure being greater than or equal to the second threshold coolant pressure.

A third example of the turbocharged engine, optionally including one or more of the previous examples, further comprises where the control valve comprises a thermostat comprising an actuator, wherein the actuator is actuated in response to a charge air cooler coolant flowing to the thermostat comprising a temperature greater than a threshold temperature, wherein the actuator actuates the closure to the fully opened position.

A fourth example of the turbocharged engine, optionally including one or more of the previous examples, further comprises where the control valve comprises a coolant temperature compensation passage, wherein the coolant temperature compensation passage fluidly couples an expansion tank to a lower chamber of the control valve, wherein the lower chamber is fluidly separated from the upper chamber via the closure.

A method comprising flowing charge air to a membrane arranged in a control valve to inflate the membrane and press against a closure to actuate the closure in a direction opposite a direction of force of a spring, flowing an engine coolant into an upper chamber of the control valve to press against the closure to actuate the closure in the direction opposite the direction of force of the spring, and flowing a charge air cooler coolant into a thermostat of the control valve to actuate an actuator to press against the closure to actuate the closure in the direction opposite the direction of force of the spring.

A first example of the method further comprises where flowing the charge air to the membrane further comprises adjusting the closure to a partially open position in response to a charge air pressure being greater than or equal to a first threshold charge air pressure and less than a second threshold charge air pressure, wherein the partially open position comprises partially aligning a tunnel of the closure with separated portions of a coolant circuit fluidly coupling a charge air cooler to a radiator, further comprising adjusting the closure to a fully open position in response to the charge air pressure being greater than the second threshold charge air pressure, wherein the fully open position comprises completely aligning the tunnel of the closure with separated portion of the coolant circuit, wherein a flow rate of the charge air cooler coolant through the coolant circuit is greater in the fully open position than the partially open position.

A second example of the method, optionally including the first example, further comprises where the flowing the engine coolant into the upper chamber comprises a coolant pump setting a pressure of the engine coolant based on an engine speed, wherein the flowing the engine coolant further comprises adjusting the closure to a partially open position in response to the pressure of the engine coolant being greater than or equal to a first threshold coolant pressure and less than a second threshold coolant pressure, further comprising adjusting the closure to a fully open position in response to the pressure of the engine coolant being greater than or equal to the second threshold coolant pressure.

A third example of the method, optionally including one or more of the previous examples, further comprises where flowing the charge air cooler coolant further comprises where the actuator is actuated in response to a temperature of the charge air cooler coolant being greater than a threshold charge air cooler temperature.

A fourth example of the method, optionally including one or more of the previous examples, further comprises where flowing coolant from an expansion tank into a lower chamber of the control valve via a coolant temperature compensation line, wherein the lower chamber is fluidly separated from the upper chamber via the closure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    flowing charge air to a membrane arranged in a control valve to inflate the membrane and press against a closure to actuate the closure in a direction opposite a direction of force of a spring;
    flowing an engine coolant into an upper chamber of the control valve to press against the closure to actuate the closure in the direction opposite the direction of force of the spring; and
    flowing a charge air cooler coolant into a thermostat of the control valve to actuate an actuator to press against the closure to actuate the closure in the direction opposite the direction of force of the spring.

2. The method of claim 1, wherein flowing the charge air to the membrane further comprises adjusting the closure to a partially open position in response to a charge air pressure being greater than or equal to a first threshold charge air pressure and less than a second threshold charge air pressure, wherein the partially open position comprises partially aligning a tunnel of the closure with separated portions of a coolant circuit fluidly coupling a charge air cooler to a radiator, further comprising adjusting the closure to a fully open position in response to the charge air pressure being greater than the second threshold charge air pressure, wherein the fully open position comprises completely aligning the tunnel of the closure with separated portion of the coolant circuit, wherein a flow rate of the charge air cooler coolant through the coolant circuit is greater in the fully open position than the partially open position.

3. The method of claim 1, wherein the flowing the engine coolant into the upper chamber comprises a coolant pump setting a pressure of the engine coolant based on an engine speed, wherein the flowing the engine coolant further comprises adjusting the closure to a partially open position in response to the pressure of the engine coolant being greater than or equal to a first threshold coolant pressure and less than a second threshold coolant pressure, further comprising adjusting the closure to a fully open position in response to the pressure of the engine coolant being greater than or equal to the second threshold coolant pressure.

4. The method of claim 1, wherein flowing the charge air cooler coolant further comprises actuating the actuator in response to a temperature of the charge air cooler coolant being greater than a threshold charge air cooler temperature.

5. The method of claim 1, further comprising flowing coolant from an expansion tank into a lower chamber of the control valve via a coolant temperature compensation line, wherein the lower chamber is fluidly separated from the upper chamber via the closure.

\* \* \* \* \*